United States Patent [19]

Naka

[11] Patent Number: 4,807,226

[45] Date of Patent: Feb. 21, 1989

[54] SECONDARY STATION OPERABLE IN A DATA COMMUNICATION NETWORK LIKE A PRIMARY STATION UPON OCCURRENCE OF A FAULT

[75] Inventor: Yoshihiro Naka, Tokyo, Japan

[73] Assignee: NEC Corporation, Japan

[21] Appl. No.: 7,135

[22] Filed: Jan. 23, 1987

[30] Foreign Application Priority Data

Jan. 24, 1986 [JP] Japan .................................. 61-14159

[51] Int. Cl.$^4$ .............................................. G06F 11/00
[52] U.S. Cl. .......................................... 371/8; 371/33
[58] Field of Search ...................... 371/7, 8, 9, 11, 12, 371/15, 22, 33

[56] References Cited

U.S. PATENT DOCUMENTS

| | | | |
|---|---|---|---|
| 3,754,211 | 8/1973 | Rocher | 371/33 |
| 4,332,027 | 5/1982 | Malcolm | 371/33 |
| 4,549,297 | 10/1985 | Nishimoto | 371/33 |
| 4,586,086 | 4/1986 | Ohzeki | 371/33 |
| 4,646,300 | 2/1987 | Goodman | 371/33 |

*Primary Examiner*—Michael R. Fleming
*Attorney, Agent, or Firm*—Laff, Whitesel, Conte & Saret

[57] ABSTRACT

In a secondary station which is used in a data communication network between a pair of primary stations and which comprises a receiver for detecting a flag in each of signal combinations transmitted from either of the primary stations at a predetermined time interval and a transmitter for transmitting towards a particular one of the primary station, upon detection of the flag, a first combined signal comprising the flag and a data signal which should be transmitted towards the particular primary station, a controller is used in controlling the transmitter to make the transmitter transmit towards a different one of the primary stations, when the receiver does not detect the flag transmitted from the particular primary station upon lapse of the predetermined time interval from next previous detection of the flag transmitted from the particular primary station but detects the flag transmitted from the different primary station, a second combined signal comprising the data signal and the flag which is transmitted from the different primary station. The controller may be coupled to a timer which is used for each primary station in counting up to the predetermined time interval for the flag transmitted from the particular primary station and up to a half of the predetermined time interval for the flag transmitted from the different primary station to make the transmitter transmit the second combined signal.

3 Claims, 5 Drawing Sheets

SECONDARY STATION OPERABLE IN A DATA COMMUNICATION NETWORK LIKE A PRIMARY STATION UPON OCCURRENCE OF A FAULT

BACKGROUND OF THE INVENTION

This invention relates to a secondary communication equipment for use in a data communication or transmission network between a pair of primary communication equipments. The primary and secondary communication equipments are installed in primary and secondary stations. Therefore, the primary and the secondary communication equipments may alternatively be called the primary and the secondary stations.

In the manner which will later be described with reference to a few of nine figures of the accompanying drawing, a known data communication network comprises a pair of primary communication equipments and a series of secondary communication equipments between the primary communication equipments. The primary and the secondary communication equipments are connected together by a pair of unidirectional data channels or lines. Each primary communication equipment is for successively transmitting signal combinations at a predetermined time interval through a pertinent one of the data channels. Each secondary communication equipment comprises a receiver for detecting, among other, a flag in each signal combination and a transmitter coupled to the receiver for transmitting, upon detection of the flag, a combined signal which comprises the flag and a data signal which should be transmitted from the secondary communication equipment under consideration towards a particular one of the primary communication equipments.

In the known data communication network, each primary communication equipment collects such data signals from the series of secondary communication equipment. When a fault occurs in one of the data channels that transmits the data signals to the particular primary communication equipment, the flag does not reach those of the secondary communication equipments which are downstream from a point of the fault in the data channel in question. It is impossible for either of the primary communication equipments to collect the data signals from the series of secondary communication equipments.

SUMMARY OF THE INVENTION

It is, therefore, an object of the present invention to provide a secondary communication equipment which is for use in a data communication network between a pair of primary communication equipments use in transmitting a data signal to either of the primary communication equipments. Another object is to provide equipment which is capable of transmitting the data signal to one of the primary communication equipments even when a fault occurs in the data communication network between the secondary communication equipment and the other of the primary communication equipments.

Other objects of this invention will become clear as the description proceeds.

According to this invention, a secondary communication equipment is used in a data communication network between a pair of primary communication equipments. Each primary communication equipment is used for successively transmitting signal combinations at a predetermined time interval. Each signal combination comprises a flag, and which included detecting means for detecting the flag in each signal combination. A transmitting means responsive to a detection of the flag is coupled to the detecting means for transmitting a first combined signal towards a particular one of the primary communication equipments. The first combined signal comprises the flag and a data signal which should be transmitted from the secondary communication equipment towards the particular primary communication equipment. A controlling means is coupled to the detecting means for controlling the transmitting means to transmit a second combined signal towards a different one of the primary communication equipments when the detecting means (a) does not detect a flag in the signal transmitted from the particular primary communication equipment, (b) after a lapse of the predetermined time interval following the next previous detection of a transmitted flag from the particular primary communication equipment, but (c) detects a flag transmitted from the different primary communication equipment. The second combined signal comprises the data signal and the flag transmitted from the different primary communication equipment.

DESCRIPTION OF THE PREFERRED EMBODIMENT

Figure 1:
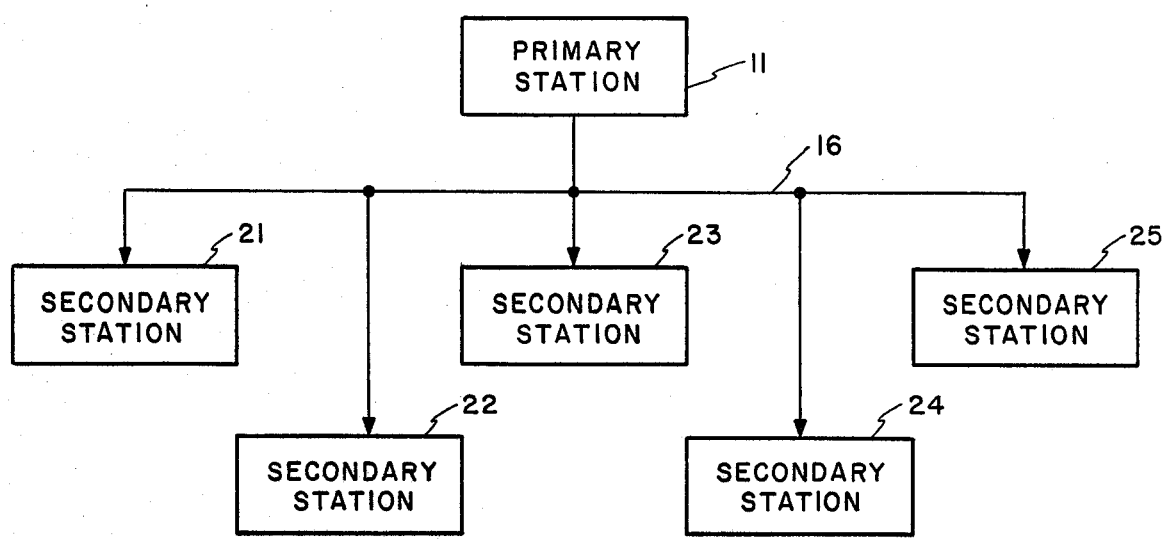
FIG. 1 is a block diagram of a conventional data communication network.

Referring to FIG. 1, a conventional data communication or transmission network will first be described in order to facilitate an understanding of the present invention. The data communication network is of the "poling-selecting type, as it is called in the art. In the data communication network, data signals are transmitted in the manner which is standardized in IS 1745 of ISO and will presently be described.

The data communication network comprises only one primary communication equipment 11 and a plurality of secondary communication equipments. The primary and the secondary communication equipments 21-25 are connected together by a common data channel or line 16. Merely by way of example, first through fifth secondary communication equipments 21, 22, 23, 24, and 25 are illustrated. Different equipment numbers are assigned to the respective secondary communication equipments 21 through 25.

On controlling data from the secondary communication equipments 21 through 25, the primary communication equipment 11 sends poling codes over the data channel 16 at predetermined intervals of time. By using the equipment numbers, each poling code specifies one of the secondary communication equipments 21 to 25 as a specific communication equipment. When the specific communication equipment has no data which should be transmitted to the primary communication equipment 11, the specific communication equipment sends a predetermined control code back to the primary communication equipment 11 in response to the poling code which specifies the specific communication equipment. The control code informs the primary communication equipment 11 of the facts that the poling code is correctly received by the specific communication equipment and that the specific communication equipment has no data at present. When there are no data to be transmitted, the specific communication equipment sends the data to the primary communication equipment 11. Alternatively, the specific communication equipment sends a specific data frame which is indicative of the fact that the specific communication equipment has data which should be transmitted to the primary communication equipment 11.

When control data should be transmitted from the primary communication equipment 11 to a particular one of the secondary communication equipments 21 through 25, the primary communication equipment 11 sends a selecting code to the particular communication equipment to establish a data transfer link. Thereafter, the primary communication equipment 11 supplies the particular communication equipment with a data frame which comprises the control data.

If a fault occurs in the data channel 16 extending between two adjacent ones of the secondary communication equipments 21 through 25, the data communication network is only partly operative. For example, let the fault be present between the second and the third secondary communication equipments 22 and 23. In this case, the primary communication equipment 11 can collect the data from only the third through the fifth secondary communication equipments 23 to 25. Even when the data channel 16 and the secondary communication equipments 21 through 25 are duly operable, the data communication network becomes inoperative if a fault occurs in the primary communication equipment 11.

Figure 2:
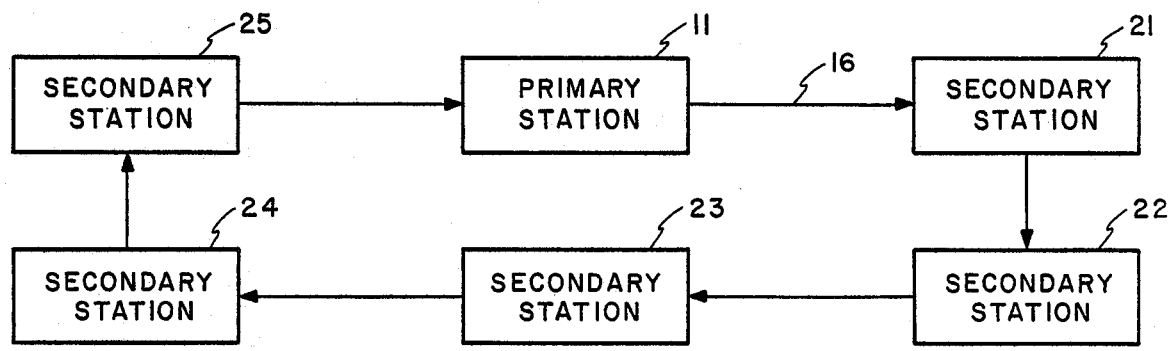
FIG. 2 is a block diagram of another conventional data communication network.

Turning to FIG. 2, another conventional data communication network comprises similar parts which are designated by like reference numerals. In contrast to the data communication network illustrated with reference to FIG. 1, the data channel 16 is a loop. That is, the fifth secondary communication equipment 25 is directly connected to the primary communication equipment 11 through a part of the data channel 16. It will herein be said that the data communication of network FIG. 2 is operable in a loop mode. In the data communication network operable in the loop mode, it is common to resort to the high level data control (HLDC) procedure which is standardize in IS 3309 of ISO, DIS 4335, or the like. This procedure will be described in the following specification.

Figure 3:
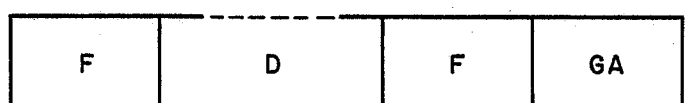
FIG. 3 shows a format of a signal combination transmitted from a primary communication equipment of the data communication network illustrated in FIG. 2.

Referring to FIG. 3 for a short while, it will be assumed that, in FIG. 2, the data channel 16 is used in clockwise transmitting data signals and that the first secondary communication equipment 21 has data which should be transmitted to the primary communication equipment 11 through the second through the fifth secondary communication equipments 22 to 25. The primary communication equipment 11 supplies the first primary communication equipment 21 with a data frame which comprises a start flag F, a data part D, and an end flag. The data frame is followed by a go-ahead flag GA. Typically, the start flag has a first bit pattern "01111110" of eight bits. The end flag also has the first bit pattern and is therefore indicated in FIG. 3 by the reference letter F. The go-ahead flag has a second bit pattern "01111111" of eight bits. The data part represents data and includes a CRC (cyclic redundancy check) code. On transmitting the data part, an "0" bit is inserted as an additional "0" bit after a secession of five "1" bits. This makes it possible to discriminate the start, the end, and the go-ahead flags from the data part. The data part does not represent the data if there are no data which should be transmitted to the data channel 16.

Figure 4:
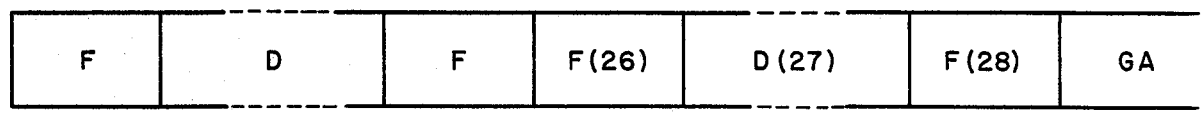
FIG. 4 shows a format of a combined signal transmitted from a secondary communication equipment of the data communication network depicted in FIG. 2.

Turning to FIG. 4, the first secondary communication equipment 21 detects the go-ahead flag transmitted from the primary communication equipment 11 and sends the data frame to the second secondary communication equipment 22 with a delay of one bit. On transmitting the data to the second secondary communication equipment 22, the go-ahead flag GA of FIG. 3 is changed to a start flag 26. More particularly, an "0" bit is substituted for the "1" bit that stands last in the second bit pattern. Next and subsequent to the start flag 26, the data are sent as a data part 27 which includes the CRC code and is followed by an end flag 28 and then by the go-ahead flag GA.

Turning back to FIG. 2, the primary communication equipment 11 can thus collect the data from the respective secondary communication equipments 21 through 25. When a data frame is directed to a particular one of the secondary communication equipments 21 to 25, the particular communication equipment detects the end flag of the data frame directed theoreto. Subsequently, the CRC code is processed so as to check whether or not the data frame is subjected to an undesirable disturbance before reaching the particular communication equipment. The additional "0" bit or bits are removed from the data received.

If a fault occurs in the data channel 16, the primary communication equipment 11 can not collect the data of the respective secondary communication equipments 21 through 25. In order to get rid of such a defect, an improved data communication network is disclosed in U.S. Pat. No. 4,446,551 issued to Toshiya Seo and assigned to Kabushiki Kaisha Meidensha, Japan.

In the improved data communication network, first and second loop-shaped data channels are used in clockwise and counterclockwise transmitting data signals. A fault in either or both of the data channels is detected at each secondary communication equipment by using two timers for each data channel. When a fault is detected in the first loop-shaped data channel at a specific one of the secondary communication equipments 21 to 25, the data signal transmitted through the first loop-shaped data channel is looped back through the second loop-shaped data channel to the primary communication equipment 11 at a particular one of the secondary communication equipments 21 to 25 that is upstream of the specific communication equipment in the first loop-shaped data channel.

Figure 5:
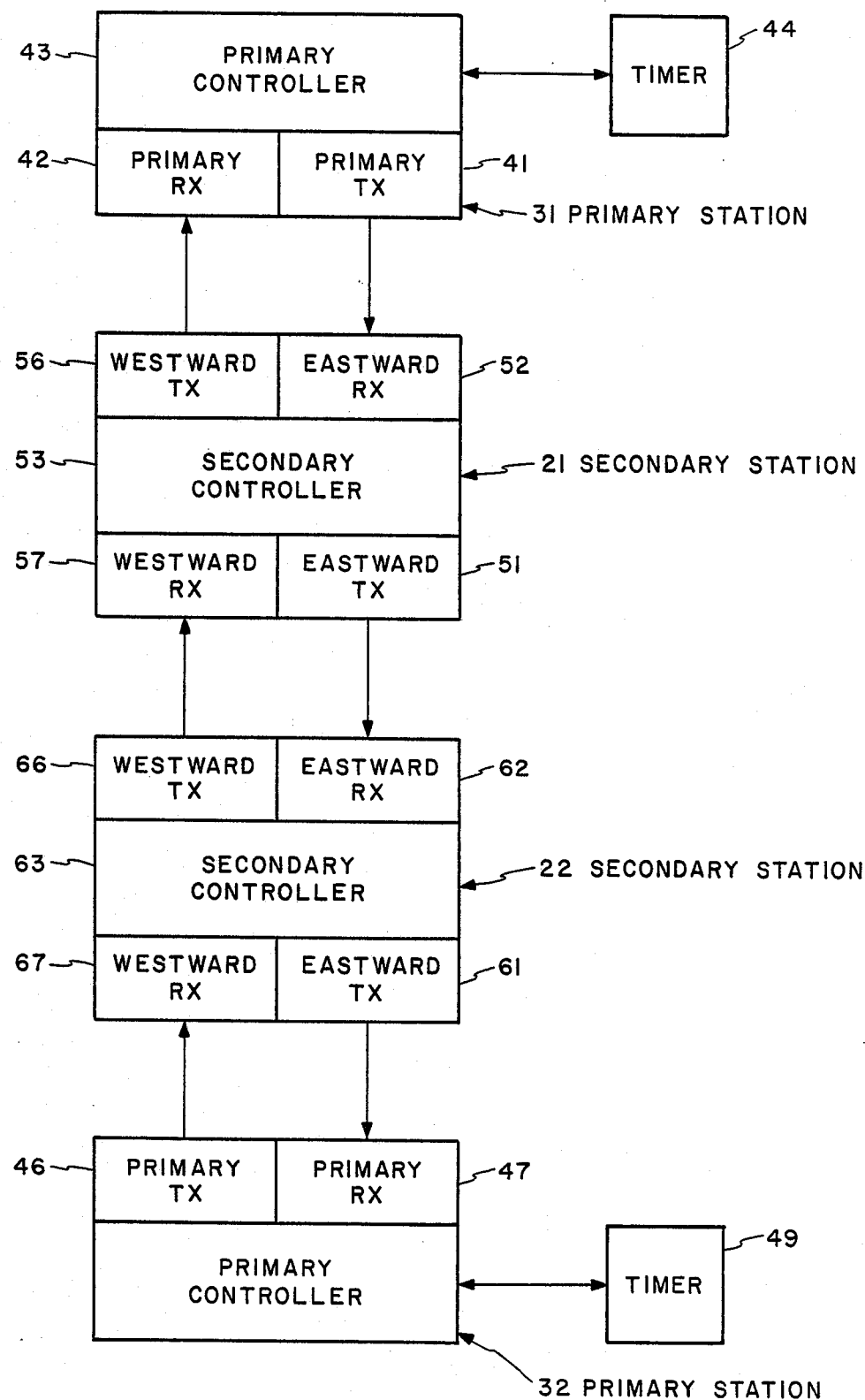
FIG. 5 is a block diagram of still another conventional data communication network.

Referring to FIG. 5, still another conventional data communication network comprises first and second primary communication equipments 31 and 32. Only the first and the second secondary communication equipments 21 and 22 are depicted adjacent to the first and the second primary communication equipments 31 and 32, merely for simplicity of illustration. The primary and the secondary communication equipments 31, 32, 21, and 22 are connected together, in series, by a pair of unidirectional data channels which will be referred to herein as "eastward" and "westward" data channels. The data communication network is operable in the loop mode and according to the high level data control procedure in the manner which will shortly be described.

The first primary communication equipment 31 comprises a first primary transmitter 41, a first primary receiver 42, a first primary controller 43, and a first primary timer 44. The second primary communication equipment 32 comprises a second primary transmitter 46, a second primary receiver 47, a second primary controller 48, and a second primary timer 49. The first secondary communication equipment 21 comprises a first eastward transmitter 51, a first eastward receiver 52, a first secondary controller 53, a first westward transmitter 56, and a first westard receiver 57. The second secondary communication equipment 22 comprises a second eastward transmitter 61, a second eastward receiver 62, a second secondary controller 63, a second westward transmitter 66, and a second westward receiver 67.

In operation and structure, the primary, the eastward, and the westward transmitters 41, 46, 51, 56, 61, and 66 are similar. The primary, the eastward, and the westward receivers 42, 47, 52, 57, 62, and 67 are similar. The primary controllers 43 and 48 are similar and are for controlling the primary transmitters and receivers 41, 42, 46, and 47 and the primary timers 44 and 49. The primary timers 44 and 49 are similar and are operable in the manner which will presently become clear. The secondary controllers 53 and 63 are similar and are for controlling the eastward and the westward transmitters and receivers 51, 52, 56, 57, 61, 62, 66, and 67 in accordance with the high level data control procedure. Each of the primary and the secondary controllers 43, 48, 53, and 63 is furthermore capable of dealing with a data signal which is directed to the communication equipment comprising the controller under consideration.

Figure 6:
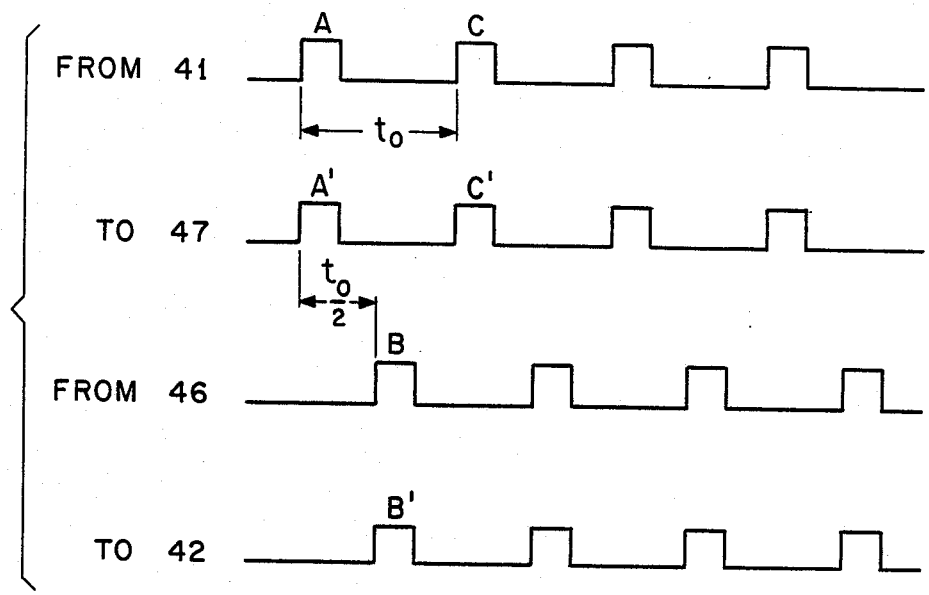
FIG. 6 is a schematic time chart for use in describing operation of a pair of primary communication equipments which are used in the data communication network shown in FIG. 5.

Referring to FIG. 6 along with FIG. 5, a first eastward data signal A is transmitted from the first primary transmitter 41 to the first eastward receiver 52 through the eastward data channel, in the manner depicted along the top line. As described in conjunction with FIG. 3, the data signal A is immediately followed by a go-ahead flag (not shown). The first eastward transmitter 51 repeats the data signal A (and the go-ahead flag) to the second eastward receiver 62 with the one-bit delay. When the first secondary communication equipment 21 has data which is to be transmitted to the second primary communication equipment 32, the first eastward transmitter 51 transmits a combined signal in which the data signal A is followed by a data signal of the first secondary communication equipment 21 and then by the go-ahead flag in the manner described in connection with FIG. 4. In this manner, the data signal A reaches the second primary receiver 47 through the first and the second secondary communication equipments 21 and 22 as a first eastward received signal A′ illustrated along a second line from the top. The fact should be noted that the first eastward received signal A′ is shown directly below the first eastward data signal A by neglecting a time lag which is mandatory between transmission of the data signal A and reception of the received signal A′.

Each of the primary timers 44 and 49 is for counting clock pulses from zero up to a certain number which is representative of a particular time interval set in the timer under consideration in the known manner when the timer is reset to zero. Usually, the primary controller 43 or 48 sets a predetermined time interval $t_0$ in the primary timer 44 or 49 connected thereto.

In response to a reception of the first eastward received signal A′, the second primary controller 48 sets a half time interval $t_0/2$ in the second primary timer 49. As soon as the second primary counter 49 counts up to the half time interval, the second primary controller 48 makes the second primary transmitter 46 send a first westward data signal B to the second westward receiver 67 in the manner depicted along a third line from the top. At the same time, the second primary controller 48 sets the predetermined time interval in the second primary timer 49. Like the first eastward data signal A, the first westward data signal B reaches the first primary receiver 42 as a first westward received signal B′ shown along a fourth line from the top, namely, along the bottom line. Using the first primary timer 44 in the manner described as regards the second primary timer 49, the first primary controller 43 makes the first primary transmitter 41 send a second eastward data signal C to the first secondary communication equipment 21 as depicted along the top line. This operation of each primary communication equipment 31 or 32 will herein be called to be in a primary equipment mode.

In this manner, eastward data signals A, C, and so forth are transmitted at the predetermined time interval $t_0$ when observed at a point along the eastward data channel. Westward data signals B and so on are likewise transmitted. It is understood that signal combinations, each including the go-ahead flag, are transmitted successively at the preteretermined time interval from one of the primary communication equipments 31 and 32 to the other thereof through the secondary communication equipments, such as 21 and 22. The fact will readily be understood that the predetermined time interval should not be shorter than a sum of the data frames collected at each primary communication equipment 31 or 32 plus the go-ahead flag. When a fault occurs in one of the data channels, the primary communication equipments 31 and 32 are rendered incapable of collecting the data from the respective secondary communication equipments 21 and 22.

Figure 7:
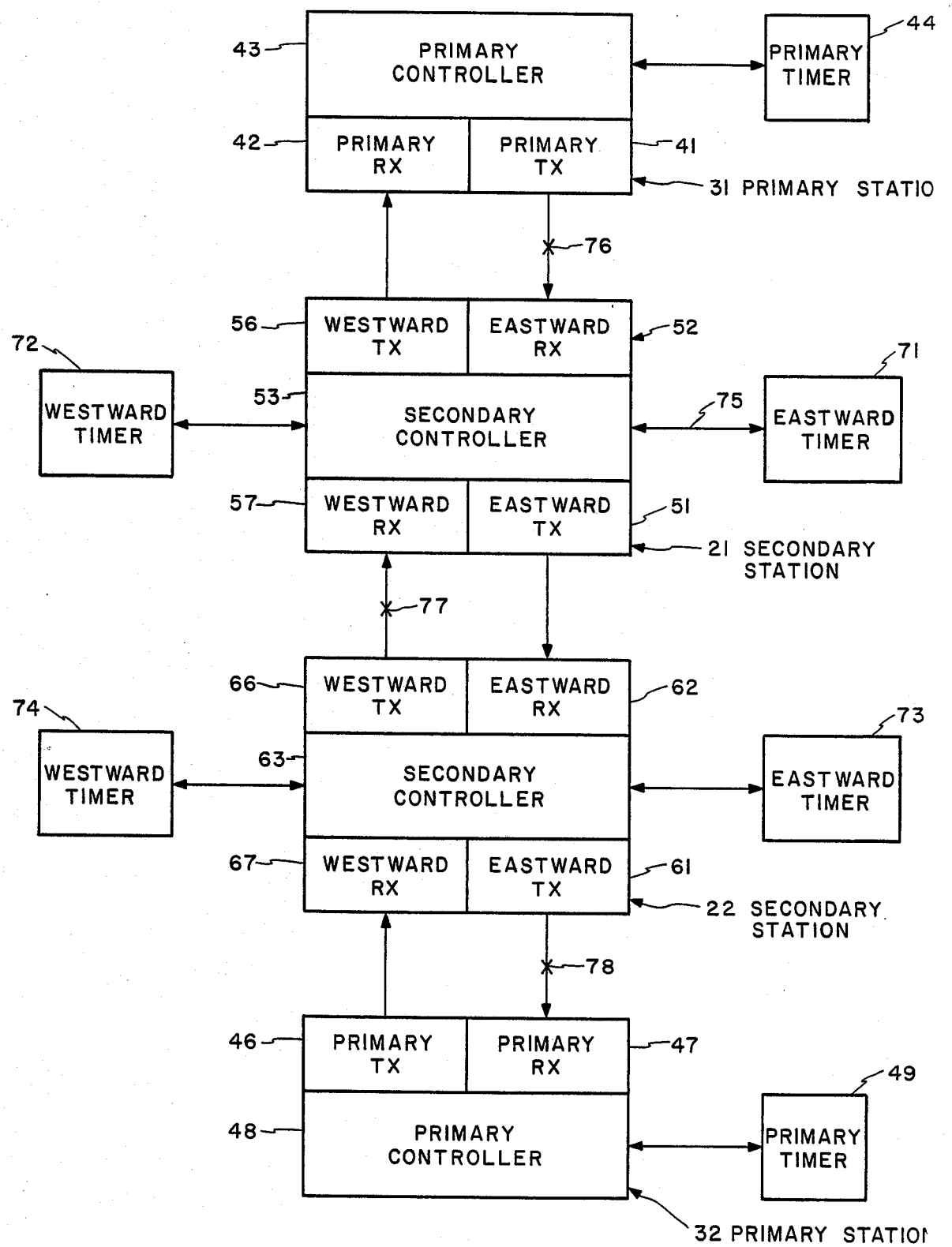
FIG. 7 is a block diagram of a data communication network which comprises a secondary communication equipment according to an embodiment of the instant invention.

Referring now to FIG. 7, this description will proceed to a data communication network which comprises a secondary communication equipment according to a preferred embodiment of this invention. As in FIG. 5, two such secondary communication equipments are illustrated as first and second secondary communication equipments 21 and 22 between first and second primary communication equipments 31 and 32. The data communication network is operable in the loop mode and in accordance with the high level data control procedure in the manner described with reference to FIG. 5. In addition to similar parts designated by like reference numerals, the data communication network comprises first eastward and westward timers 71 and 72 in the first secondary communication equipment 21 and second eastward and westward timers 73 and 74 in the second secondary communication equipment 22. The first eastward timer 71 is connected to the first secondary controller 53 through a bidirectional signal line 75. The first westward timer 72 is likewise connected to the first secondary controller 53. Similarly, the second eastward and westward timers 73 and 74 are connected to the second secondary controller 63. Each of the first and the second secondary controllers 53 and 63 is capable of controlling the timers 71 and 72 or 73 and 74 as follows.

Reference is made to FIGS. 6 and 7. Whenever the first eastward receiver 52 receivers the go-ahead flag which follows each of the eastward data signals A, C, and so forth, the first secondary controller 53 resets the first eastward timer 71. When the first westward receiver 57 detects the go-ahead flag which follows each of the westward data signals B and so on, the first secondary controller 53 resets the first westward timer 72. As soon as it is reset, each of the timers 71 and 72 starts counting up. The second eastward and westward timers 73 and 74 are likewise controlled by the second secondary controller 63. Simultaneously with reset, a longer time interval $t_1$ is ordinarily set in each of the timers 71 through 74. The longer time interval is longer than the predetermined time interval $t_0$ in the manner which will become clear as the description proceeds.

When a fault occurs in the eastward data channel at a first point 76 between the first primary and secondary communication equipments 31 and 21, the first eastward receiver 52 can not detect the go-ahead flag sent from the first primary communication equipment 31. In this event, the first eastward timer 71 is not reset but counts up to the longer time interval. When a fault occurs in the westward data channel at a second point 77 between the first and the second secondary communication equipments 21 and 22, the first westward receiver 57 can not detect the go-ahead flag sent from the second primary communication equipment 32 and repeated by the second secondary communication equipment 22. In this instance, the first westward timer 72 is not reset but counts up to the longer time interval. In connection with the longer time interval, it should be noted that the data frame is repeated at each secondary communication equipment with the one-bit delay and that the go-ahead flag may further be delayed as a result of an addition of a data frame which is representative of the data which should be transmitted from each secondary communication equipment to a pertinent one of the primary communication equipments 31 and 32.

Figure 8:
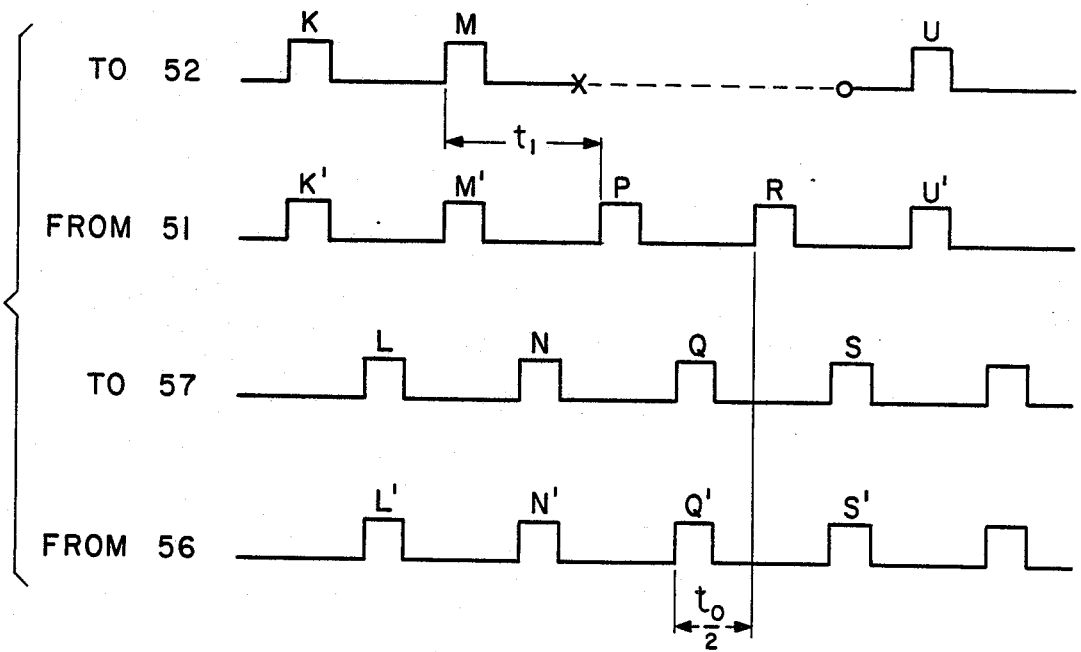
FIG. 8 is a schematic time chart for use in describing operation of the secondary communication equipment illustrated in FIG. 7.

Referring to FIG. 8 in addition to FIG. 7, the first eastward receiver 52 receives a data signal from the first primary communication equipment 31 as a first eastward received signal K which is depicted along the top line and is followed by the go-ahead flag (not shown in FIG. 8). As soon as the first eastward receiver 52 detects the go-ahead flag, the first secondary controller 53 resets the first eastward timer 73 and makes the first eastward transmitter 51 repeat the received signal K to the second secondary communication equipment 22 as a first eastward transmitted signal K' shown along a second line from the top with a time lag neglected. In the manner described in conjunction with FIG. 6, the first westward receiver 57 receives substantially the half time interval $t_0/2$ later a data signal from the second primary communication equipment 32 through the second secondary communication equipment 22 as a first westward received signal L illustrated along a third line from the top. In response to detection of the go-ahead flag which immediately follows the received signal L, the first and secondary controller 53 resets the first westward timer 72 and makes the first westward transmitter 56 repeat the received signal to the first primary communication equipment 31 as a first westward transmitted signal L' shown along the bottom line. This operation of the secondary communication equipment 21 or 22 will herein be described as being in a secondary equipment mode.

Receiving the first westward transmitted signal L', the first primary communication equipment 31 transmits a data signal which is received by the first eastward receiver 52 as a second eastward received signal M. The first secondary controller 53 resets the first eastward timer 71 and makes the first eastward transmitter 51 transmit a second eastward transmitted signal M'. In a similar manner, the first westward receiver 57 receives a second westward received signal N. The first westward transmitter 56 transmits a second westward transmitted signal N'.

It will be assumed that the eastward data channel is subjected to a fault at the first point 76 in the manner indicated along the top line by an "X". The first eastward receiver 52 can not receive a data signal from the first primary communication equipment 31 as a third eastward received signal. The first eastward timer 71 is not reset even after lapse of the predetermined time interval $t_0$ from last previous detection of the go-ahead flag which immediately follows the second eastward received signal M'.

When the first eastward timer 71 counts up to the longer time interval $t_1$, the first secondary controller 53 makes the first eastward transmitter 51 send data of the first secondary communication equipment 21 to the second secondary communication equipment 22 as a third eastward transmitted signal P in the manner illustrated along the second line. the first secondary controller 53 furthermore sets the predetermined time interval $t_0$ in the first eastward timer 71. In the manner depicted along the third line, the first westward receiver 57 receives a third westward received signal Q from the second primary communication equipment 32 through the second secondary communication equipment 22, at a time which is substantially the half time interval later.

Responsive to detection of the go-ahead flag immediately following the received signal Q, the first secondary controller 53 sets the half time interval in the first eastward timer 71 and makes the first westward transmitter 56 send a third westward transmitted signal Q' to the first primary communication equipment 31. It should clearly be noted that the eastward timer 71 is used in this event rather than the westward timer 72. Unless the fault disappears, the first eastward receiver 52 can not receive another data signal from the first primary communication equipment 31 as a fourth eastward received signal.

When the first eastward timer 71 counts up to the half time interval, the first secondary controller 53 makes the first eastward transmitter 52 send data of the first secondary communication equipment 21 as a fourth eastward transmitted signal R. The first secondary controller 53, moreover, sets the predetermined time interval in the first eastward timer 71.

It is now appreciated that the first eastward timer 71 is used like the primary timer 44 or 49 and that the first secondary communication equipment is temporarily put into the primary equipment mode of operation to serve as a primary communication equipment, when a fault occurs upstream thereof in the data channel. In other words, a bidirectional data transfer link is established between the first secondary communication equipment 21 and the second primary communication equipment 32 through the second secondary communication equipment 22. As a consequence, the second primary communication equipment 32 can collect the data of the first and the second secondary communication equipments 21 and 22 despite presence of the fault at the first point 76.

In FIGS. 7 and 8, the first westward receiver 57 receives a fourth westward received signal S transmitted from the second primary communication equipment 32 through the second secondary communication equipment 22. The first westward transmitter 56 transmits a fourth westward transmitted signal S' to the first primary communication equipment 31. It will be assumed that the fault meanwhile disappears in the manner depicted along the top line by a small circle. Receiving the transmitted signal S' like the transmitted signals L' and others, the first primary communication equipment 31 transmits a data signal which is now received by the first eastward receiver 52 as a fifth eastward received signal U. Responsive to a detection of the go-ahead flag which immediately follows the received signal U, the first secondary controller 53 resets the first eastward timer 71 and makes the first eastward transmitter 51 repeat the received signal U as a fifth eastward transmitted signal U'. It is now appreciated that the first secondary communication equipment 21 is switched from the primary equipment mode back to the secondary equipment mode.

Upon occurrence of the fault at the first point 76, the second secondary communication equipment 22 is also put into the primary equipment mode if the second eastward timer 73 counts up to the longer time interval after reset when the second eastward receiver 62 detects the go-ahead flag which reaches the second secondary communication equipment 22 immediately following the second eastward transmitted signal M'. When the go-ahead flag of the third eastward transmitted signal P is detected by the second eastward receiver 62, the primary equipment mode is turned back to the secondary equipment mode. If the go-ahead flag of the third eastward transmitted signal P is detected before a lapse of the longer time interval, the second secondary communication equipment 22 is not put into the primary equipment mode but is kept in the secondary equipment mode.

In FIG. 7, it will be assumed that the westward data channel is subjected to a fault at the second point 77. When the first westward receiver 57 does not detect the go-ahead flag until lapse of the longer time interval $t_1$ from last previous detection of the go-ahead flag, the first secondary communication equipment 21 is put into the primary equipment mode of operation. More specifically, the first primary controller 53 makes the first westward transmitter 56 transmit data of the first secondary communication equipment 31 together with the go-ahead flag as soon as the first westward timer 72 counts up to the longer time interval. The half time interval after reception of the data signal, the first primary communication equipment 31 transmits another data signal and the go-ahead flag towards the second primary communication equipment 32 in the manner described before. When the first eastward receiver 52 detects the go-ahead flag sent from the first primary communication equipment 31, the first secondary controller 53 sets the half time interval $t_0/2$ in the first westward timer 72. A bidirectional data transfer link is thereby established between the first secondary communication equipment 21 and the first primary communication equipment 31.

It is now understood in FIG. 5 or 7 that the first secondary communication equipment 21 comprises the first eastward and westward receivers 52 and 57 collectively as a detecting arrangement for detecting a flag in each of the signal combinations which are transmitted from either of the first and the second primary communication equipments 31 and 32 at the predetermined time interval $t_0$. A combination of the first eastward and westward transmitters 51 and 56 and the first secondary controller 53 serves as a transmitting arrangement which is coupled to the detecting arrangement and is for transmitting, upon a detection of the flag, a first combined signal towards a particular one of the primary communication equipments 31 and 32 that may be the first or the second primary communication equipment 31 or 32. The first combined signal comprises the flag and a data signal which should be transmitted from the first secondary communication equipment 21 to the particular primary communication equipment.

Reviewing FIG. 7, a combination of the first eastward or first westward timer 71 or 27 and the first secondary controller 53 is used as a controlling arrangement which is coupled to the detecting arrangement for controlling the transmitting arrangement so as to make the transmitting arrangement transmit a second combined signal towards a different one of the primary communication equipments 31 and 32 when the detecting arrangement does not detect the flag transmitted from the particular primary communication equipment upon the lapse of the predetermined time interval from next previous detection of the flag transmitted from the particular primary communication equipment. The different primary communication equipment is one of the primary communication equipments 31 and 32 that is different from the particular primary communication equipment. The second combined signal comprises the data signal and the flag which is transmitted from the different primary communication equipment.

In FIG. 7, the controlling arrangement comprises a timer 71. A combination of the secondary controller 53 and the bidirectional signal line 75 serves as a setting arrangement which is coupled to the detecting arrangement for setting a half of the predetermined time interval in the timer 71 when the detecting arrangement does not detect the flag transmitted from the particular primary communication equipment and furthermore when the detecting arrangement detects the flag transmitted from the different primary communication equipment. The combination serves also as an activating arrangement which is coupled to the timer 71 for activating the transmitting arrangement to make the transmitting arrangement transmit the second combined signal towards the different primary communication equipment when the timer 71 counts up to the half of the predetermined time interval.

Again in FIG. 7, it will be assumed that the eastward data channel is subjected to a fault at a third point 78 between the second primary communication equipment 32 and the adjacent secondary communication equipment, namely, the second secondary communication equipment 22 in the example being illustrated. Inasmuch as no go-ahead flag is detected by the second primary receiver 47 after a reception of the go-ahead flag last previous to the occurrence of the fault, the second primary timer 49 counts up to the longer time interval $t_1$. In response, the second primary controller 48 makes the second primary transmitter 46 transmit a data signal and the go-ahead flag to the second secondary communication equipment 22. The second primary controller 48, furthermore, sets the predetermined time interval $t_0$ in the second primary timer 49. Inasmuch as no go-ahead flag is received during the presence of the fault, the second primary controller 48 never sets the half time interval $t_0/2$ in the second secondary timer 49, in the meantime. In this instance, the eastward data channel is quiescent. Only the westward data channel is alive.

Figure 9:
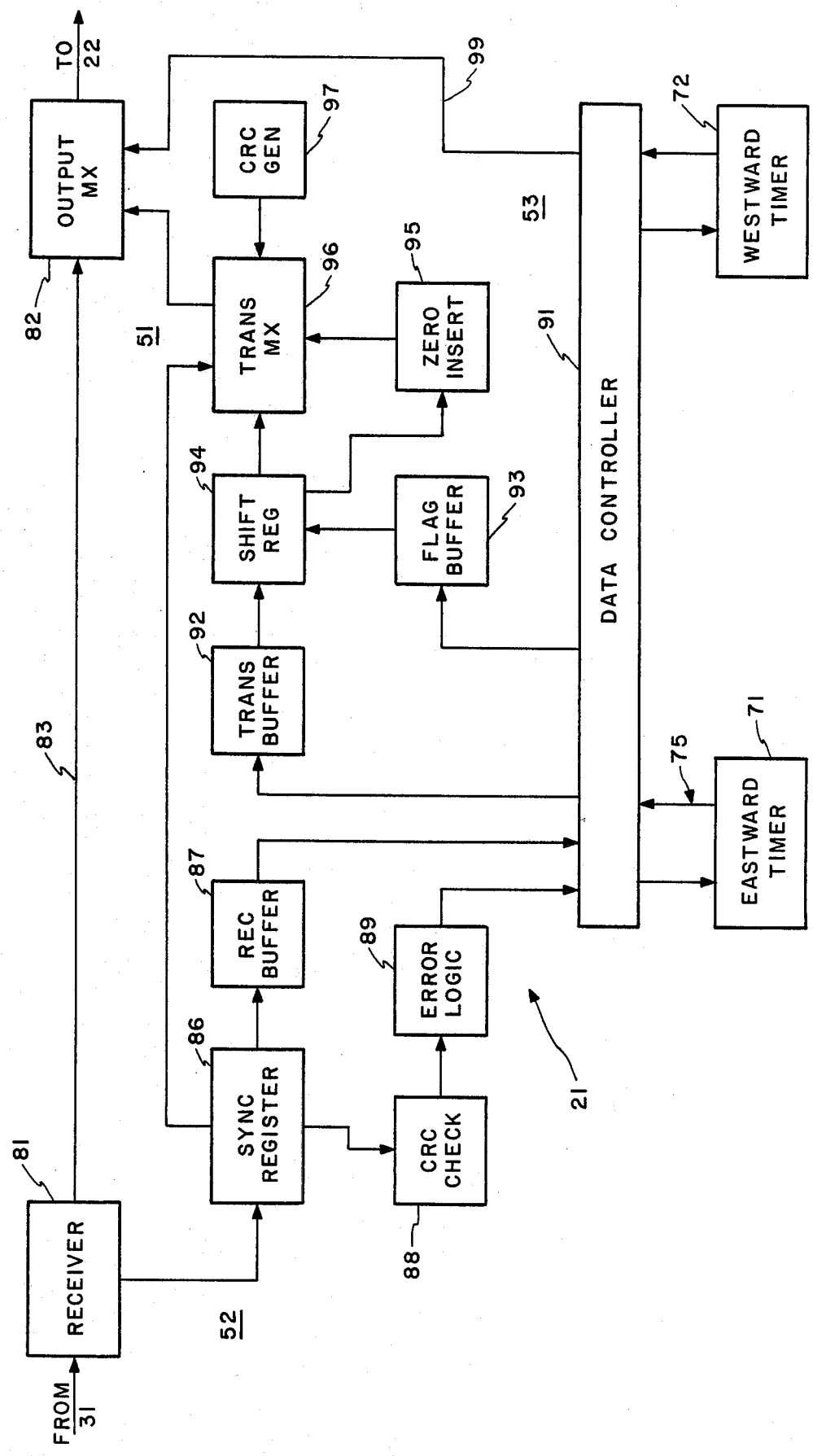
FIG. 9 is a partial block diagram of the secondary communication equipment depicted in FIG. 7.

Referring now to FIG. 9, the first secondary communication equipment 21 will be described more in detail as regards the first eastward transmitter and receiver 51 and 52, the first secondary controller 53, and the first eastward and westward timers 71 and 72. It will be presumed that a data signal is transmitted from the first primary communication equipment 31 together with the go-ahead flag and that the data signal should be processed in the first secondary communication equipment 21 and should furthermore be repeated to the second secondary communication equipment 22.

In the eastward receiver 52, a receiver 81 receives the data signal as a received signal and delivers the received signal to an output multiplexer 82 of the eastward transmitter 51 through a bypass line 83 and to a synchronous register 86 which detects as a part of the eastward receiver 52 the go-ahead flag and the start and the end flags and moreover removes the additional "0" bit or bits from the data signal to deliver a compressed datum to a reception buffer register 87. Detecting the end flag, the synchronous register 86 delivers a copy of the compressed datum to a CRC checker 88 which deals with the CRC code described hereinabove. Responsive to a result obtained by the CRC checker 88, an error logic 89 produces an error datum indicative of the undesirable disturbance described earlier.

The compressed datum and the error datum are delivered to a data controller 91 which serves as a main element of the secondary controller 53 and controls the eastward and the westward timers 71 and 72 in the manner described above. When the first secondary communication equipment 21 has data which should be transmitted towards the second primary communication equipment 32 through the second secondary communication equipment 22 in addition to the data signal received from the first primary communication equipment 31, the data controller 91 supplies a transmission buffer register 92 of the eastward transmitter 51 with the data and a flag buffer register 93 with the end flag 28 described in conjunction with FIG. 4 and the go-ahead flag which should immediately follow the end flag 28.

In the eastward transmitter 51, a shift register 94 arranges the data, the end flag 28, and the go-ahead flag into a serial datum which comprises a data part 27 described in connection with FIG. 4. The data part 27 is delivered to a zero inserting logic 95 which produces the additional "0" bit or bits. The serial datum is delivered to a transmission multiplexer 96. Supplied with the go-ahead flag from the synchronous register 86, the transmission multiplexer 96 changes the go-ahead flag to the start flag 26 described in conjunction with FIG. 3 or 4. On the other hand, a CRC generator 97 produces a CRC code for the serial datum. Using the serial datum, the additional "0" bit or bits, and the CRC code, the transmission multiplexer 96 forms a bit succession in which the data part 27 immediately follows the start flag 26 and is immediately followed by the end flag 28 and then by the go-ahead flag which are set in the flag buffer register 93 and are supplied through the shift register 94. The output multiplexer 82 makes the bit sequence immediately follow the end flag of the received signal sent from the receiver 81.

When the eastward timer 71 counts up to the longer time interval $t_1$ as a result of a fault in the eastward data channel as regards the secondary communication equipment being illustrated, the data controller 91 preferably controls the output multiplexer 82 through a control line 99. In this event, the data controller 91 sets the half time interval $t_0/2$ in the eastward timer 71 in response to the go-ahead flag which is transmitted from the second primary communication equipment 32 and is detected by the synchronous detector (not shown) of the first westward receiver 57 described in conjunction with FIG. 7.

A review of FIG. 7 will be continued with FIG. 9 also reviewed. The transmitting arrangement comprises the output multiplexer 82. The controlling arrangement comprises a combination of the data controller 91 and the control line 99. The combination is coupled to the output multiplexer 82 as a deactivating arrangement for deactivating the output multiplexer 82 so as not to make the output multiplexer 82 transmit the first combined signal towards the particular primary communication equipment when the activating arrangement activates the output multiplexer (not shown) of the first westward transmitter 56 to make the last-mentioned multiplexer transmit the second combined signal to the different primary communication equipment which is the first primary communication equipment 31 under the circumstances.

While this invention has thus far been described in specific conjunction with a single preferred embodiment thereof and a detailed example of the preferred embodiment, it will now be readily possible for one skilled in the art to put this invention into effect in various other manners. Above all, the go-ahead flag may be a flag which is equivalent thereto and is placed in a different time position in each data frame.

What is claimed is:

1. A secondary communication equipment for use in a data communication network between a pair of primary communication equipments, each of said primary communication equipments being adapted for successively transmitting signal combinations at predetermined time intervals, each signal combination comprising a flag; said secondary communication equipment comprising:

detecting means for detecting said flag in each signal combination;

transmitting means coupled to said detecting means and responsive to a detection of said flag for transmitting a first combined signal towards a particular one of said primary communication equipments, said first combined signal comprising said flag and a data signal which should be transmitted from said secondary communication equipment towards said particular one of the primary communication equipments; and controlling means coupled to said detecting means for controlling said transmitting means to cause said transmitting means to transmit a second combined signal towards a different one of said primary communication equipments in response to said detecting means failure to detect the flag that is transmitted from said particular one of the primary communication equipments, said controlling means causing said transmitting means to so transmit after a lapse of said predetermined time interval following the last previous detection of the flag transmitted from said particular one of the primary communication equipments provided that said controlling means detects the flag transmitted from said different one of the primary communication equipments, said second combined signal comprising said data signal and the flag transmitted from said different one of the primary communication equipments.

2. A secondary communication equipment as claimed in claim 1, wherein said controlling means comprises:
a timer;
setting means coupled to said detecting means for setting a half of said predetermined time interval in said timer when said detecting means does not detect the flag transmitted from said particular one of the primary communication equipments and provided that said detecting means detects the flag transmitted from said particular one of the primary communication equipments; and
activating means coupled to said timer for activating said transmitting means to cause said transmitting means transmit said second combined signal towards said different one of the primary communication equipments when said timer counts up to said half of the predetermined time interval.

3. A secondary communication equipment as claimed in claim 2, wherein said controlling means further comprises deactivating means coupled to said activating means for deactivating said transmitting means to cause said transmitting means not to transmit said first combined signal towards said particular one of the primary communication equipments when said activating means activates said transmitting means to make said transmitting means transmit said second combined signal.

* * * * *